No. 782,113. PATENTED FEB. 7, 1905.
H. J. DOHRER.
VEHICLE BRAKE.
APPLICATION FILED JUNE 1, 1904.

WITNESSES:
William Gordon.
Neta Ross.

INVENTOR:
Henry J. Dohrer,
BY Eugene Ayres,
ATTORNEY.

No. 782,113. Patented February 7, 1905.

UNITED STATES PATENT OFFICE.

HENRY J. DOHRER, OF ST. JOSEPH, MISSOURI.

VEHICLE-BRAKE.

SPECIFICATION forming part of Letters Patent No. 782,113, dated February 7, 1905.

Application filed June 1, 1904. Serial No. 210,689.

*To all whom it may concern:*

Be it known that I, HENRY J. DOHRER, a citizen of the United States, residing at St. Joseph, in the county of Buchanan and State of Missouri, have invented certain new and useful Improvements in Vehicle-Brakes; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my device is to provide a brake that will hold the rear wheels of a vehicle at any tension desired, that is adapted for use with buggies and other light vehicles, as well as for heavy vehicles of all descriptions, and that can be used, if desired, on wheels with rubber tires.

Figure 1:
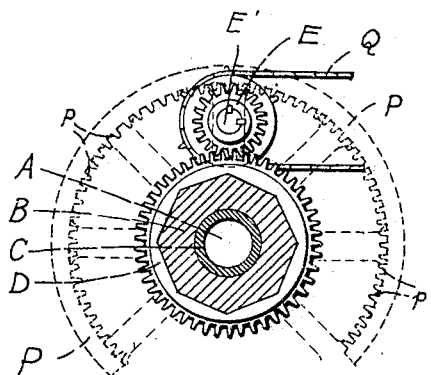
Figure 2:
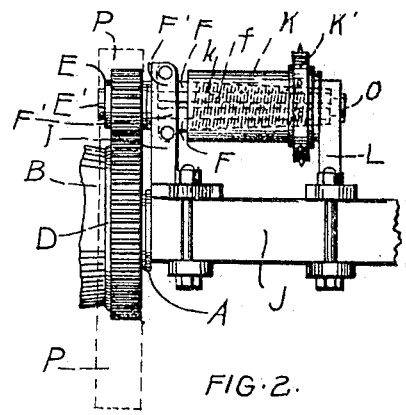
Figure 3:
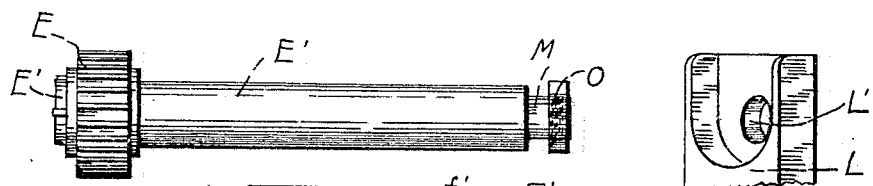
Figure 4:
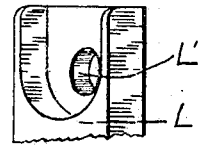
Figures 5, 6:
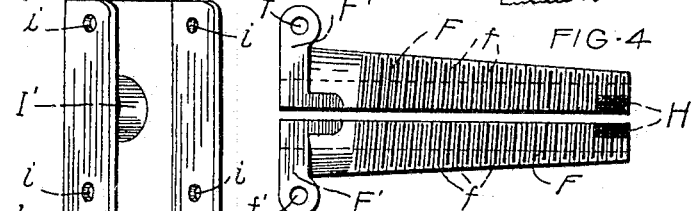
Figure 7:
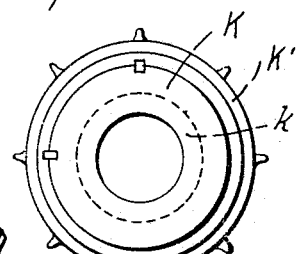
Figure 8:
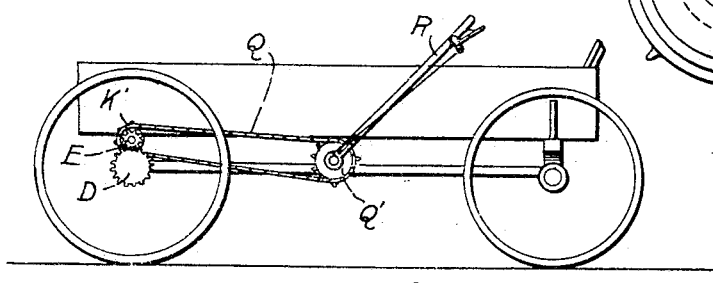

In the drawings, Figure 1 is a section through a hub, showing an elevation of a brake-gear with chain and sprocket, the large spur-wheel in dotted lines showing a manner of gearing when device is used on heavy vehicles, the small gear being adapted for use with light vehicles. Fig. 2 is a side elevation of the invention, showing the axle of a vehicle broken away and a casting thereon provided with cogs, supports upon the axle carrying a shaft and pinion adapted to mesh with the cogs of the casting, and a compressing-cylinder and its sprocket, the dotted lines indicating interior threads adapted to enable the cylinder to screw upon and tighten duplicate grip-plates upon said shaft, which are provided with threads on their outside. Fig. 3 is an elevation of the pinion and shaft. Fig. 4 is a support for one end of said shaft; Fig. 5, a supporting-guide for the shaft adapted to set on the inner side of the pinion, as shown in Fig. 2. Fig. 6 is an elevation of duplicate grip-plates threaded to receive the compressing-cylinder and provided with end plates with bolt-receptacles for securing them to the supporting-guides when placed in position on said shaft. Fig. 7 is an end elevation of the compressing-cylinder and sprocket-wheel, the dotted lines showing the larger end of the interior of the cylinder; and Fig. 8 illustrates a manner in which the device may be operated on a vehicle.

In the drawings, A is a skein of the vehicle-wheel; B is the hub; C, the boxing.

D is a cogged casting fastened to hub B, conforming to the shape of said hub. A smaller pinion E is adapted to mesh in the cogs of casting D and is carried by shaft E'.

F F are duplicate grip-plates provided with threads $f$ $f$ on the outside. These are partially cone shape on the outside, as shown in Fig. 6, and are cast with end plates F' F' at their larger ends, said end plates having perforations $f''$ $f''$. These grip-plates are shown in Fig. 6 as they would appear if fitted upon their shaft, Fig. 3, their edges spaced slightly apart to permit of purchase when compressed by the cylinder. The interior of each of said grip-plates is semicircular in form, each corner at the smaller end having a square face H.

I is a supporting-guide for shaft E' and a support for plates F' F' at end of plates F F. It is provided with perforations $i$ $i$, corresponding with perforations $f''$ $f''$, through which bolts are inserted. In the center of said support there is a hole I' of a size to permit shaft E' to pass through, thereby serving as a guide for said shaft. The bottom of support I is rigidly attached to vehicle-axle J. It may be in the form shown in Fig. 2 or it may be of shape suiting it to any position in which it is desired to place the brake on the axle.

K is a cylinder with a sprocket K'. This cylinder is provided with threads $k$ $k$ in its interior, adapted to engage with threads $f$ $f$ when shaft E' is passed through hole I' and the grip-plates are in position in support I and around shaft E'. The cylinder is of a diameter uniform with that of grip-plates F F. The square faces H H are for the purpose of assisting in preventing the grip-plates turning in end support L while the compressing-cylinder is in action. End M of shaft E' passes through hole L' in support L, and nut O is adapted to hold shaft E' in position. Support L is fastened to axle J in a manner similar to that in which support I is fastened to said axle.

The construction and arrangement of the cogged casting and pinion, as already described, is intended for use with light vehicles; but when my device is intended for heavy vehicles I may dispense with cogged casting D and employ a casting P, as denoted by dotted lines in Fig. 1, the cogs $p$ $p$ being on the inside of the casting, the pinion E working in cogs $p$ $p$.

Q is an endless chain operating on sprocket K' and sprocket Q'. It is adapted to operate the device by means of a ratchet-lever R or by other suitable mechanism.

From the foregoing description it will be seen that when it is desired to slacken the speed of a vehicle it is only necessary to press the lever forward. This operates upon sprocket Q'. Sprocket K' is connected with sprocket Q' by endless chain Q and is thus revolved. Compressing-cylinder K and sprocket K' being cast as one, said cylinder is revolved around grip-plates F F, giving said plates purchases on shaft E'. Pinion E, engaging with cogs $p$ $p$ or with those on casting D, (whichever may be in use,) cause the vehicle-wheel to revolve at a speed proportionate to the tension on shaft E'.

The drawings illustrate the device for one wheel only. For the opposite wheel the construction is the same, except the threads on the grip-plates and in the compressing-cylinder run in opposite directions from that illustrated.

The dimensions of my invention are in proportion to the diameter of shaft E'.

What I claim, and desire to secure by Letters Patent, is—

1. In a vehicle-brake the combination with the axle and wheels to a vehicle of a rigidly-fastened casting around the hub of the wheel provided with cogs upon its periphery, a shaft spaced above said axle and the supports for said shaft rigidly attached to said axle, the pinion at an end of said shaft, the cogs thereon to mesh with those on said casting, the duplicate grip-plates and their end plates provided with bolt-holes and the guides on said supports for receiving said end plates and provided with holes corresponding with those on the end plates for connecting-bolts, the threads on the outer surface of said grip-plates, the flat faces at the smaller ends of said grip-plates, the compressing-cylinder the inside of which corresponds in diameter with the exterior of the grip-plates and the threads within the same corresponding with those upon the grip-plates, the sprocket on said cylinder and the endless chain, the lever and its sprocket for operating the device together with the necessary nuts, and fastenings, substantially as shown and described.

2. In a vehicle-brake the combination with an axle, the wheels and hubs, of a circular casting spaced from the hub and provided with interior cogs, a shaft and pinion said pinion operating in said space between the hub and the cogs on said circular casting, the duplicate grip-plates spaced from each other to permit purchase and adapted to grip said shaft, the supports rigidly attached to the vehicle-axle and adapted to support said shaft and pinion, grip-plates and compressing-cylinder and its sprocket, substantially as set forth and shown.

3. In a vehicle-brake, a compressing-cylinder threaded and provided with a sprocket-wheel, a shaft and its pinion, the supports and guides thereon, the grip-plates threaded to engage with the threads within the cylinder and the casting on the hub provided with cogs to engage with those on the pinion, substantially as shown and described.

4. In a vehicle-brake the combination with the cogs upon a casting carried by the hub of the wheel, of a shaft, the pinion at an end thereof whose cogs engage with those on the casting, the duplicate threaded grip-plates spaced from each other to allow for purchase, the cylinder adapted to tighten upon the grip-plates and compress said grip-plates upon the shaft, and the supporting-guides rigidly attached to the vehicle-axle and supporting said shaft and pinion, grip-plates and cylinder, substantially as shown and described.

5. In a vehicle-brake a shaft provided with a pinion, duplicate partially cone-shape grip-plates provided with outer threads and a cylinder the interior of which is threaded and the diameter of which is uniform with said grip-plates, together with the necessary supports and the cogs on the hub-casting with which said pinion engages, substantially as shown and described.

6. In a vehicle-brake, a shaft and a pinion on the same connecting it with the vehicle-wheel, the grip-plates adapted to fit around said shaft in spaced position to allow for purchase their exterior threaded and tapering to the end opposite the pinion, the compressing-cylinder whose interior is uniform with said grip-plates and whose threads engage with those thereon adapting it to be screwed upon said plates gradually compressing them, the supports carrying said mechanism on the vehicle-axle and the sprocket on the cylinder by which connection is secured with suitable operating mechanism, substantially as shown and described.

In testimony whereof I affix my signature in presence of two witnesses.

HENRY J. DOHRER.

Witnesses:
 WM. B. SNYDER,
 V. S. GOODMAN.